US012151222B2

(12) United States Patent
Sleightholme

(10) Patent No.: US 12,151,222 B2
(45) Date of Patent: Nov. 26, 2024

(54) METHOD AND APPARATUS FOR MIXING AND APPLYING CEMENTITIOUS POLYURETHANE

(71) Applicant: Paul Sleightholme, Langley (CA)

(72) Inventor: Paul Sleightholme, Langley (CA)

( * ) Notice: Subject to any disclaimer, the term of this patent is extended or adjusted under 35 U.S.C. 154(b) by 513 days.

(21) Appl. No.: 15/931,572

(22) Filed: May 13, 2020

(65) Prior Publication Data

US 2020/0360880 A1    Nov. 19, 2020

(51) Int. Cl.
*B01F 35/22* (2022.01)
*B01F 23/53* (2022.01)
(Continued)

(52) U.S. Cl.
CPC .......... *B01F 35/2202* (2022.01); *B01F 23/53* (2022.01); *B28C 5/0875* (2013.01);
(Continued)

(58) Field of Classification Search
CPC ....... B28C 5/06; B28C 5/0875; B28C 7/0418; B28C 7/163; B28C 5/1215; B28C 7/0413; B28C 5/0893; B28C 5/1238; B28C 5/16; B28C 7/02; B28C 5/08; B28C 5/0806; B28C 5/1253; E04G 21/025; E04G 21/0436; E04G 21/10; B01F 5/0473; B01F 5/048; B01F 5/0611; B01F 5/0618; B01F 2005/0091; B01F 2005/0636; B01F 25/3141; B01F 25/31423; B01F 25/4311; B01F 25/4316; B01F 25/431971; B01F 2025/931; B01F 35/2202; B01F 23/53;
(Continued)

(56) References Cited

U.S. PATENT DOCUMENTS 3,929,416 A * 12/1975 Tanaka ................... C01F 11/46
366/156.1
4,202,636 A * 5/1980 Vanderveen ........ B01F 27/1921
366/322
(Continued)

FOREIGN PATENT DOCUMENTS

CA      3080711 A1 * 8/2020 ........ B01F 15/00142
CN   106049842 A * 10/2016 ......... E01C 19/4853
(Continued)

OTHER PUBLICATIONS

CN 107322801 A machine translation Nov. 2017.*
CN 111139716 A machine translation May 2020.*
DE 3247233 A1 A machine translation Jun. 1984.*

*Primary Examiner* — Charles Cooley

(57) ABSTRACT

A device and method device for continuous mixing and laying of cementitious coating onto a substrate. There is a first mixing stage for metering and mixing a first liquid and a second liquid to create a first mix and a second mixing stage for metering and mixing the first mix with aggregate to form a second mix. The first and second mixing stages use flow meters and flow controllers for metering and restricting the flow of the first liquid, the second liquid and aggregate. A controller operatively coupled to the flow meters and flow controllers controls the mixing in a closed-feedback arrangement. A screed box applies the second mix onto the substrate to create a flooring layer. The flooring may be in a food processing plant.

20 Claims, 10 Drawing Sheets

(51) Int. Cl.
    *B01F 35/90*     (2022.01)
    *B28C 5/08*     (2006.01)
    *B28C 5/12*     (2006.01)
    *B28C 7/04*     (2006.01)
    *E04F 21/24*     (2006.01)

(52) U.S. Cl.
    CPC .......... *B28C 5/1215* (2013.01); *B28C 7/0413* (2013.01); *E04F 21/24* (2013.01); *B01F 2035/99* (2022.01); *B28C 5/0893* (2013.01); *B28C 5/1238* (2013.01); *B28C 7/0418* (2013.01)

(58) Field of Classification Search
    CPC ...... B01F 2035/99; B01F 35/00; B01F 35/20; B01F 35/2111; B28B 1/16; C04B 2111/00146; C04B 40/0028; E04F 21/24; E04F 15/12; E04F 21/08; E04F 21/248; E04F 21/02; B29C 67/242
    USPC .......................................................... 366/11
    See application file for complete search history.

(56) References Cited

U.S. PATENT DOCUMENTS

| | | | | |
|---|---|---|---|---|
| 5,018,868 A | * | 5/1991 | Baillie | B01F 33/805 366/159.1 |
| 5,044,819 A | * | 9/1991 | Kilheffer | E01C 19/46 366/156.1 |
| 5,052,874 A | * | 10/1991 | Johanson | B65G 69/20 366/186 |
| 5,590,976 A | * | 1/1997 | Kilheffer | G01G 19/08 366/8 |
| 5,609,416 A | * | 3/1997 | Duckworth | B28C 5/148 366/156.1 |
| 5,634,713 A | * | 6/1997 | Abe | B01F 33/71 406/60 |
| 5,833,361 A | * | 11/1998 | Funk | B01F 27/707 366/322 |
| 11,766,807 B2 | * | 9/2023 | Butler | B28C 5/06 366/3 |
| 2005/0073906 A1 | * | 4/2005 | Hayashi | B30B 11/246 366/322 |
| 2007/0091717 A1 | * | 4/2007 | Steinwald | G01G 23/3728 366/156.1 |
| 2015/0165393 A1 | * | 6/2015 | Schuster | B28C 7/12 366/1 |
| 2020/0360880 A1 | * | 11/2020 | Sleightholme | B01F 35/2202 |

FOREIGN PATENT DOCUMENTS

| | | | | |
|---|---|---|---|---|
| CN | 107322801 A | * | 11/2017 | |
| CN | 110195398 A | * | 9/2019 | ............ E01C 19/42 |
| CN | 110424699 A | * | 11/2019 | |
| CN | 111139716 A | * | 5/2020 | |
| CN | 111015397 B | * | 12/2020 | ......... B01F 7/00633 |
| CN | 113250427 A | * | 8/2021 | |
| DE | 3247233 A1 | * | 6/1984 | |
| GB | 527028 A | * | 10/1940 | |
| GB | 2595636 A | * | 12/2021 | |
| WO | WO-2018130913 A2 | * | 7/2018 | ............ B01F 5/0473 |

\* cited by examiner

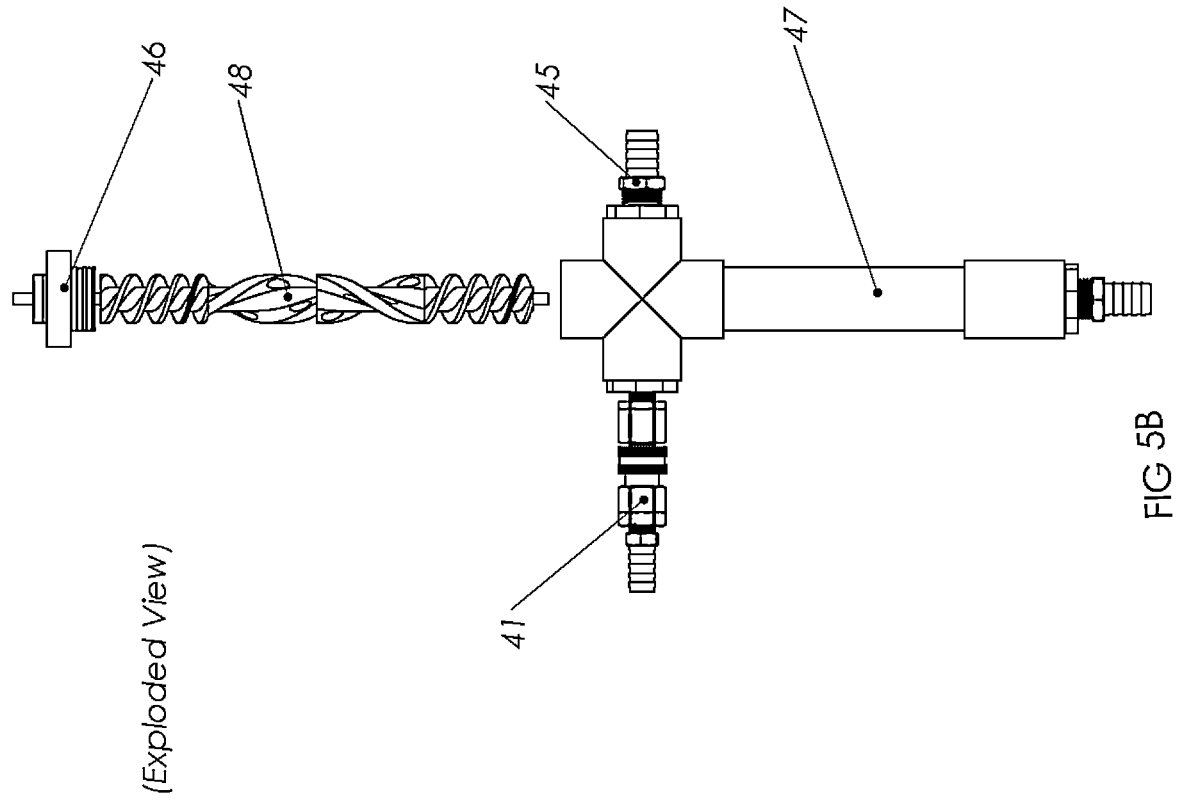
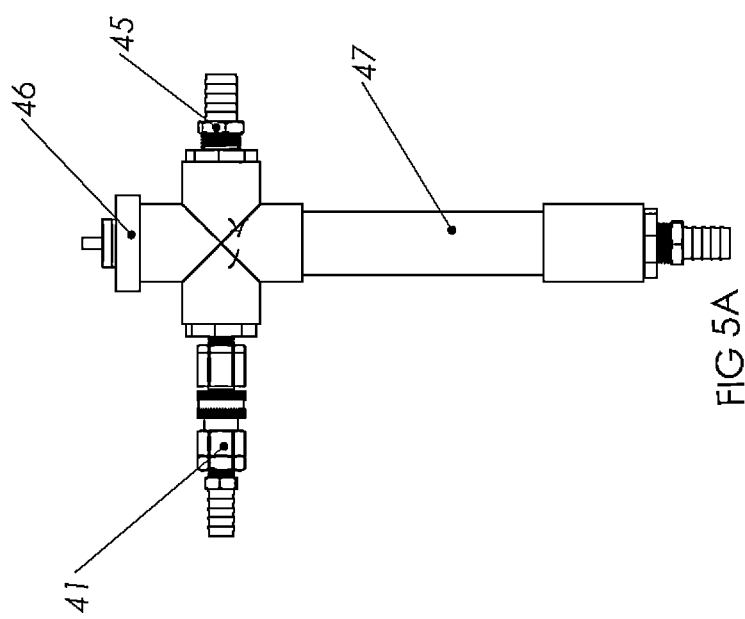
FIG 5B
FIG 5A

METHOD AND APPARATUS FOR MIXING AND APPLYING CEMENTITIOUS POLYURETHANE

FIELD OF THE INVENTION

The present invention relates to methods and apparatus for applying cementitious polyurethane as a floor topping.

BACKGROUND OF THE INVENTION

Concrete coatings are used to protect and finish floors. In industrial applications, it is desirable that the floor topping be tough and resistant to chemical spills. The coating may contain cement and polymer components.

Typically, these flooring coatings are combined, mixed, and applied manually. There are environmental concerns about exposure to these constituents while mixing, handling and breathing in the fumes. The operator and environment are exposed to open containers of isocyanates, cleaning solvents, and silica dust. Once the operation is complete, cleaning of equipment requires solvents such as xylene.

Typical mortar mixing machines are used to mix the three-part systems. Liquids are poured into the mixer from measuring jugs (which in turn have been filled from pails) or pre measured cans, they are premixed then graded silica sands and cement (usually pre batched in bags) is added, This mix is then added to a screed box which is manually pulled to screed the mix onto the floor. The mix is troweled over the floor by hand or using a power trowel. The manual steps lead to inconsistencies in the mix, exposure to chemicals and silica dust, physical strain in lifting the components and mixes which leads to uneven finishing of the floor.

The need to move mix between separate machines creates addition human and environmental exposure.

SUMMARY OF THE INVENTION

In accordance with the invention, there is provided a device for continuous mixing and laying of cementitious coating onto a substrate comprising: a first mixing stage for metering and mixing a first liquid and a second liquid to create a first mix; a second mixing stage for metering and mixing the first mix with aggregate to form a second mix; wherein the first and second mixing stages comprise flow meters and flow controllers for metering and restricting the flow of the first liquid, the second liquid and aggregate; a controller operatively coupled to the flow meters and flow controllers for controlling the mixing in a closed-feedback arrangement; and a screed box to apply the second mix onto the substrate to create the coating of a predetermined thickness.

A method of continuously mixing and laying cementitious coating onto a substrate with an automated device, comprising the steps of: loading a first liquid, a second liquid, and aggregate into respective receptacles within the device; automatedly metering and mixing the first liquid and a second liquid to create a first mix; automatedly metering and mixing the first mix with aggregate to form a second mix; and dispensing the second mix onto the substrate using a screed box to create the coating of a predetermined thickness. Mixing uses flow meters and flow controllers for metering and restricting the flow of the first liquid, the second liquid and aggregate, using a controller operatively coupled to the flow meters and flow controllers for controlling the mixing in a closed-feedback arrangement.

Further inventive aspects are set out in the attached dependent claims

Thus preferred embodiments provide an automated mixing machine that is more precise, automatically controlled, hands-off, faster, and more consistent in mixture.

BRIEF DESCRIPTION OF THE DRAWINGS

Various objects, features and advantages of the invention will be apparent from the following description of embodiments of the invention, as illustrated in the accompanying drawings.

FIG. 5A is a side view of an assembled liquid mixer.
FIG. 5B is an exploded view of the liquid mixer.

DETAILED DESCRIPTION OF THE INVENTION

Figure 1:
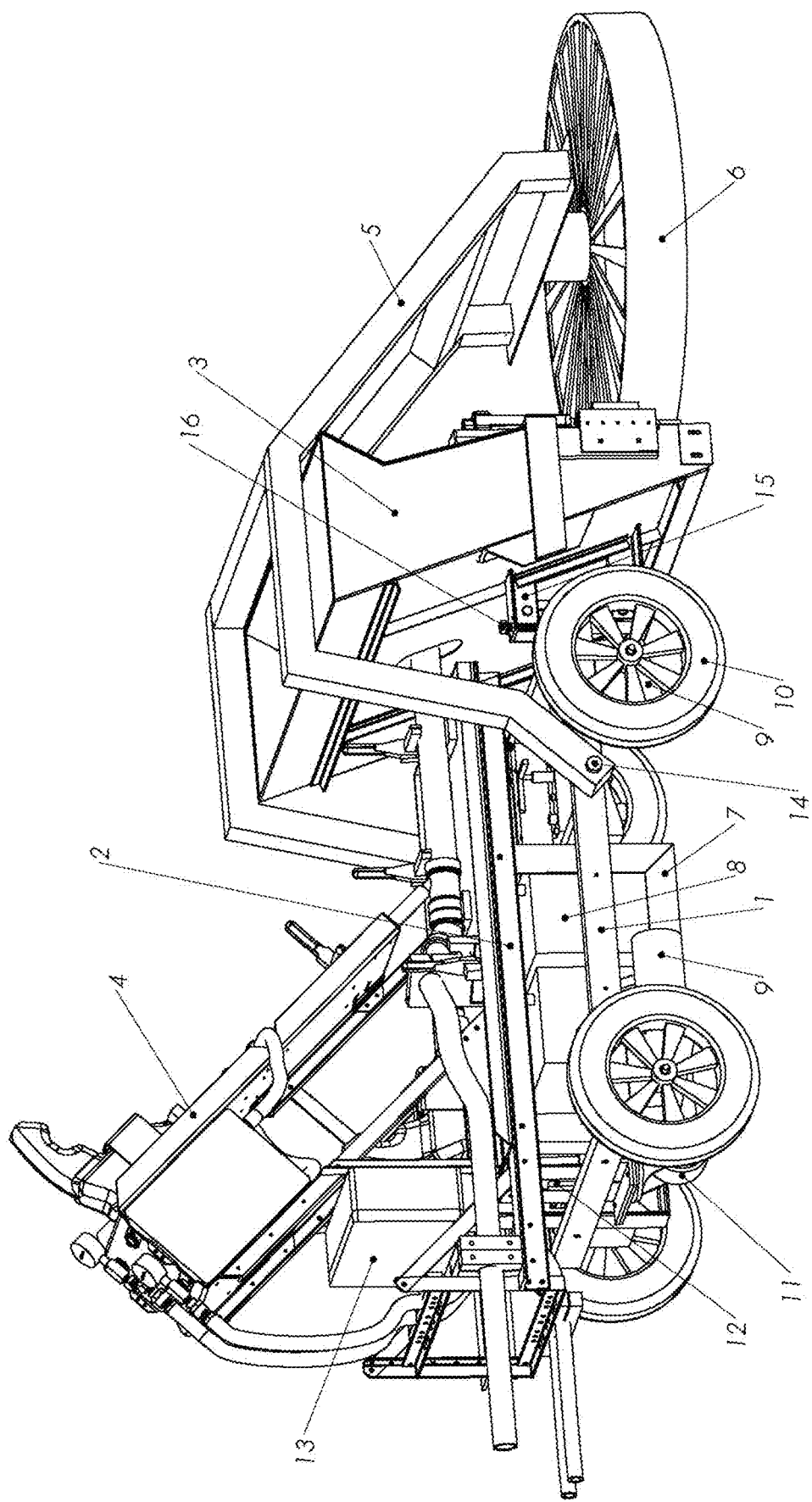
FIG. 1 is a perspective view of a device according to one embodiment.
Figure 2:
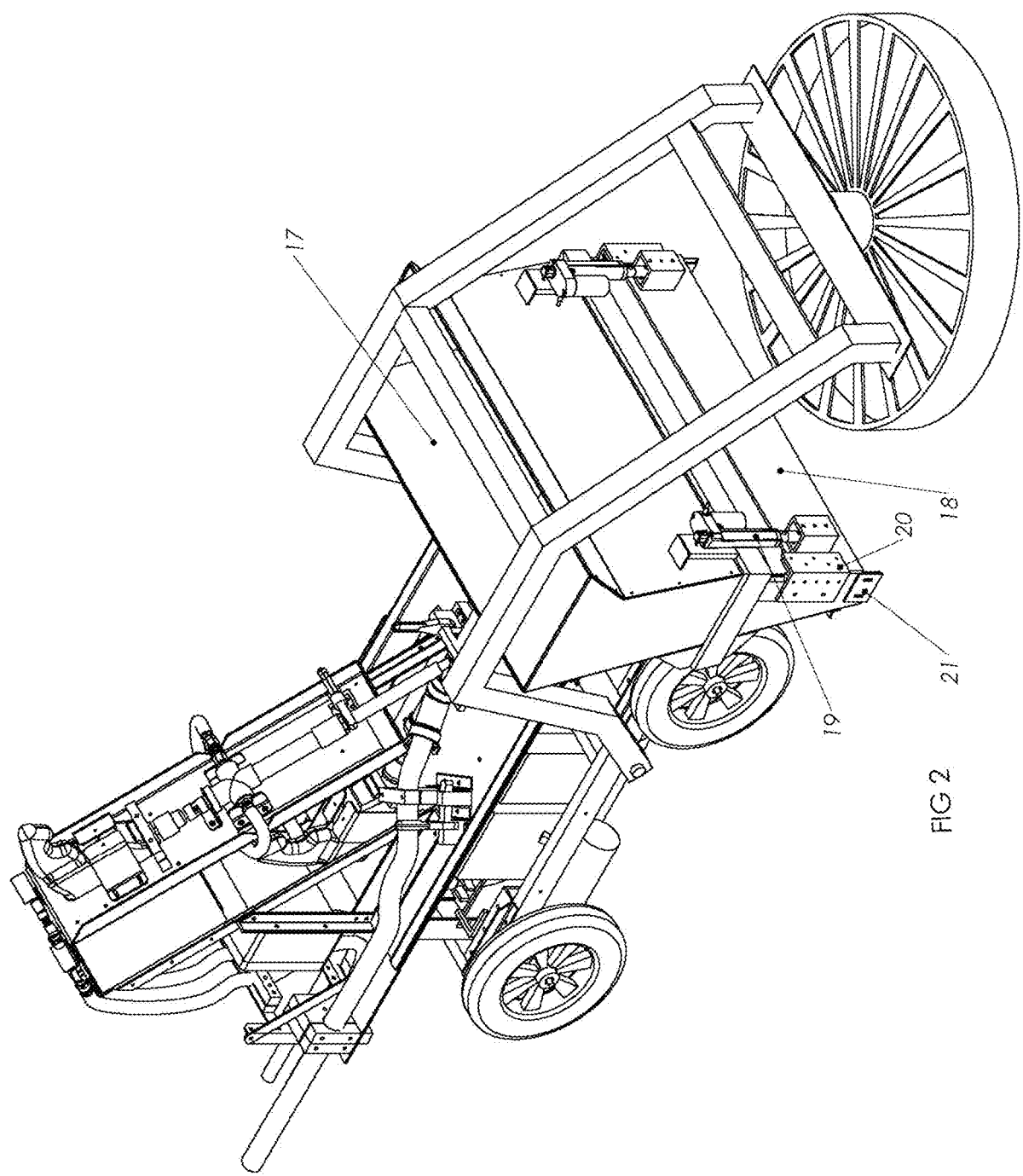
FIG. 2 is a perspective view of the device.
Figure 3:
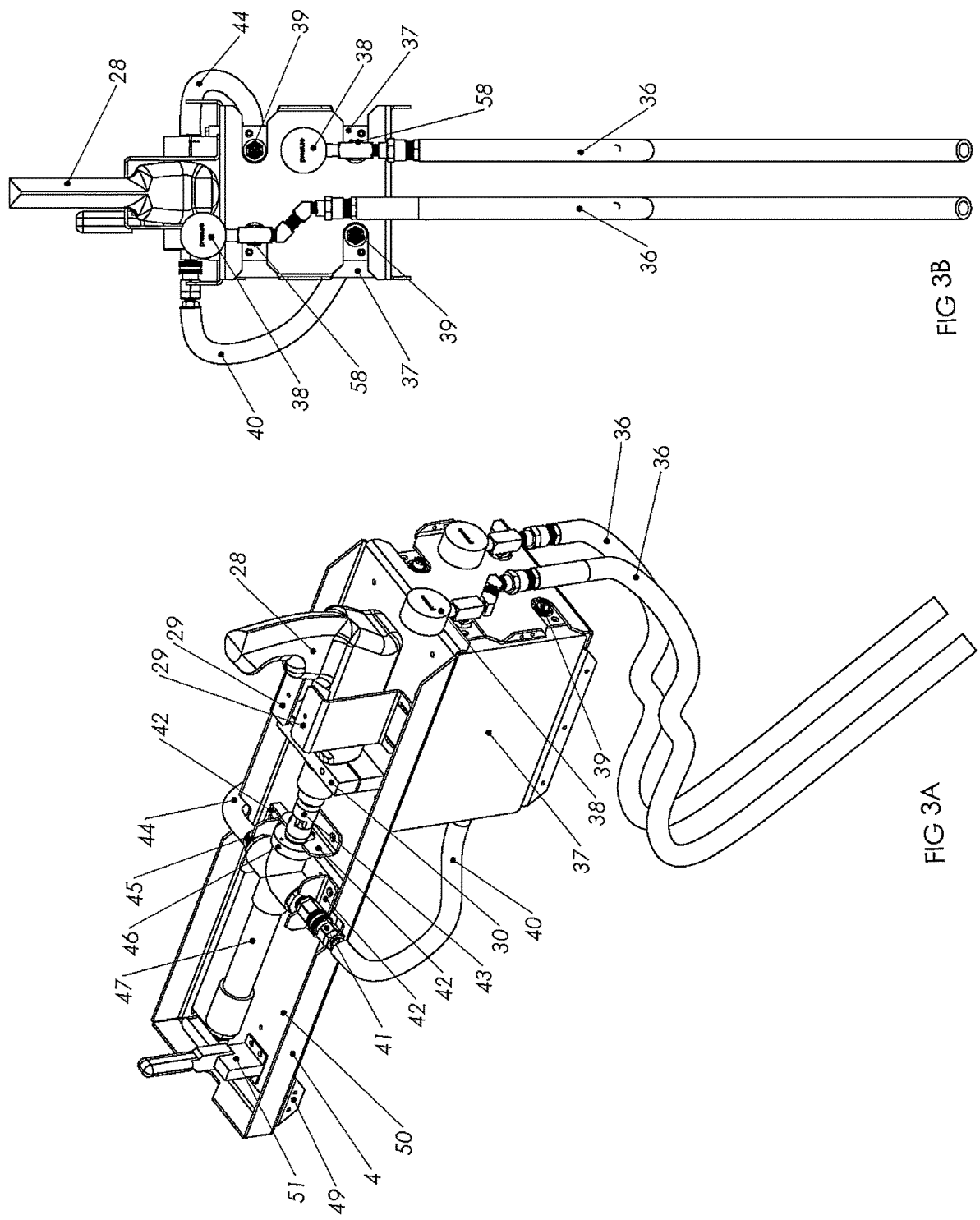
FIG. 3A is a perspective view of the liquid mixing module.
FIG. 3B is an end view of the liquid mixing module.
Figure 4:
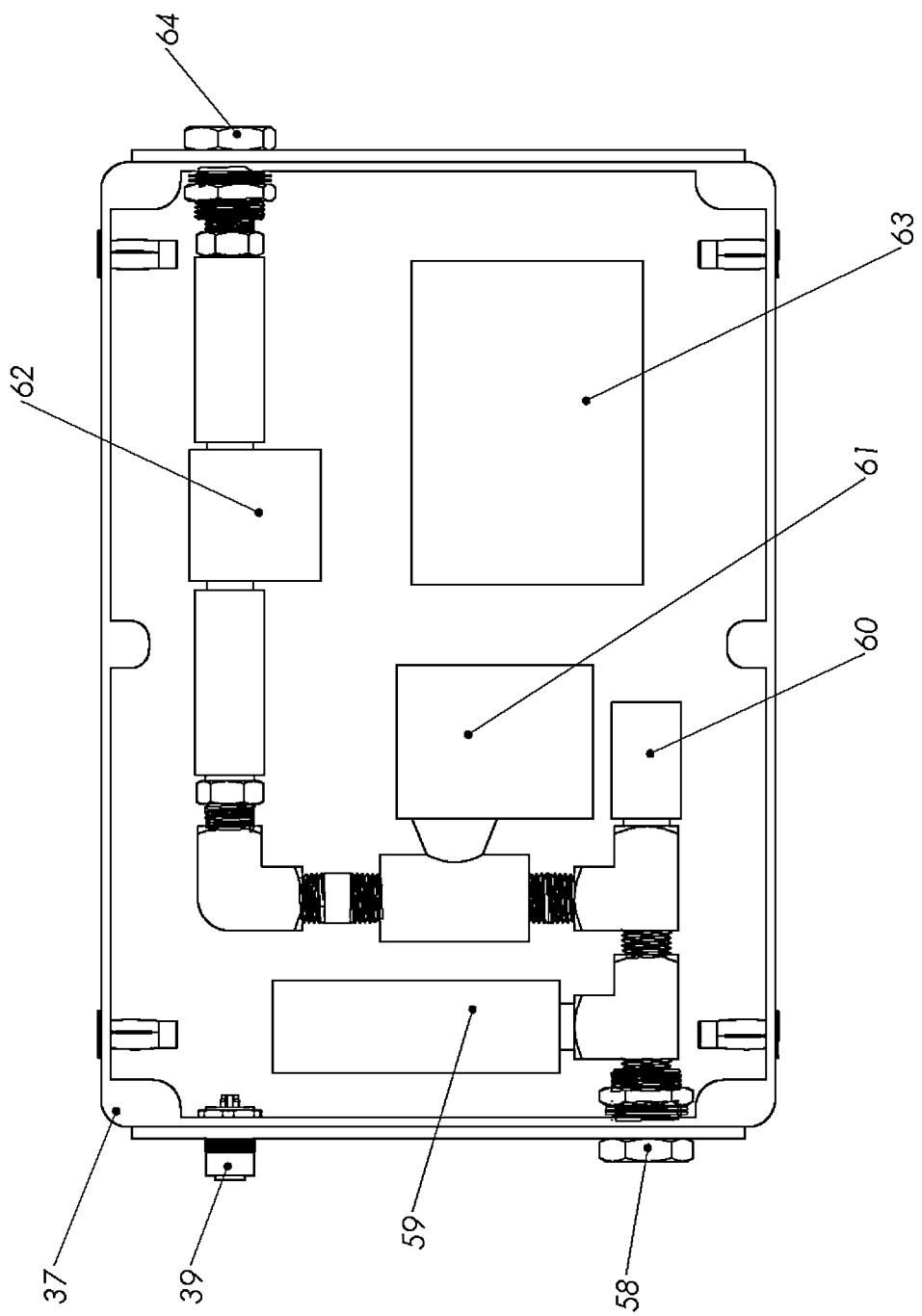
FIG. 4 is a top view of the mixing control, regulation and monitoring box.
Figure 6:
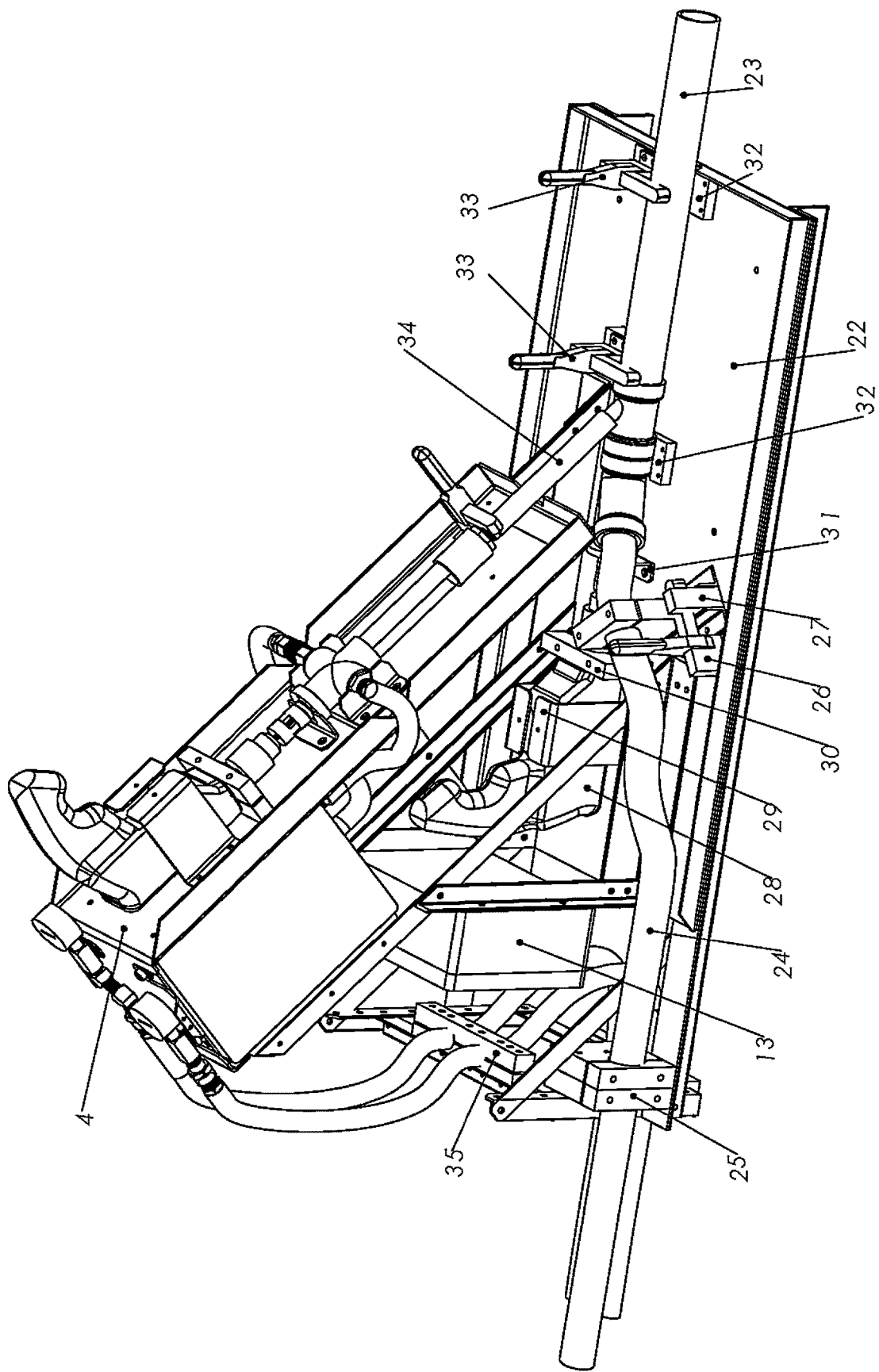
FIG. 6 is a perspective view of the mixing frame.
Figure 7:
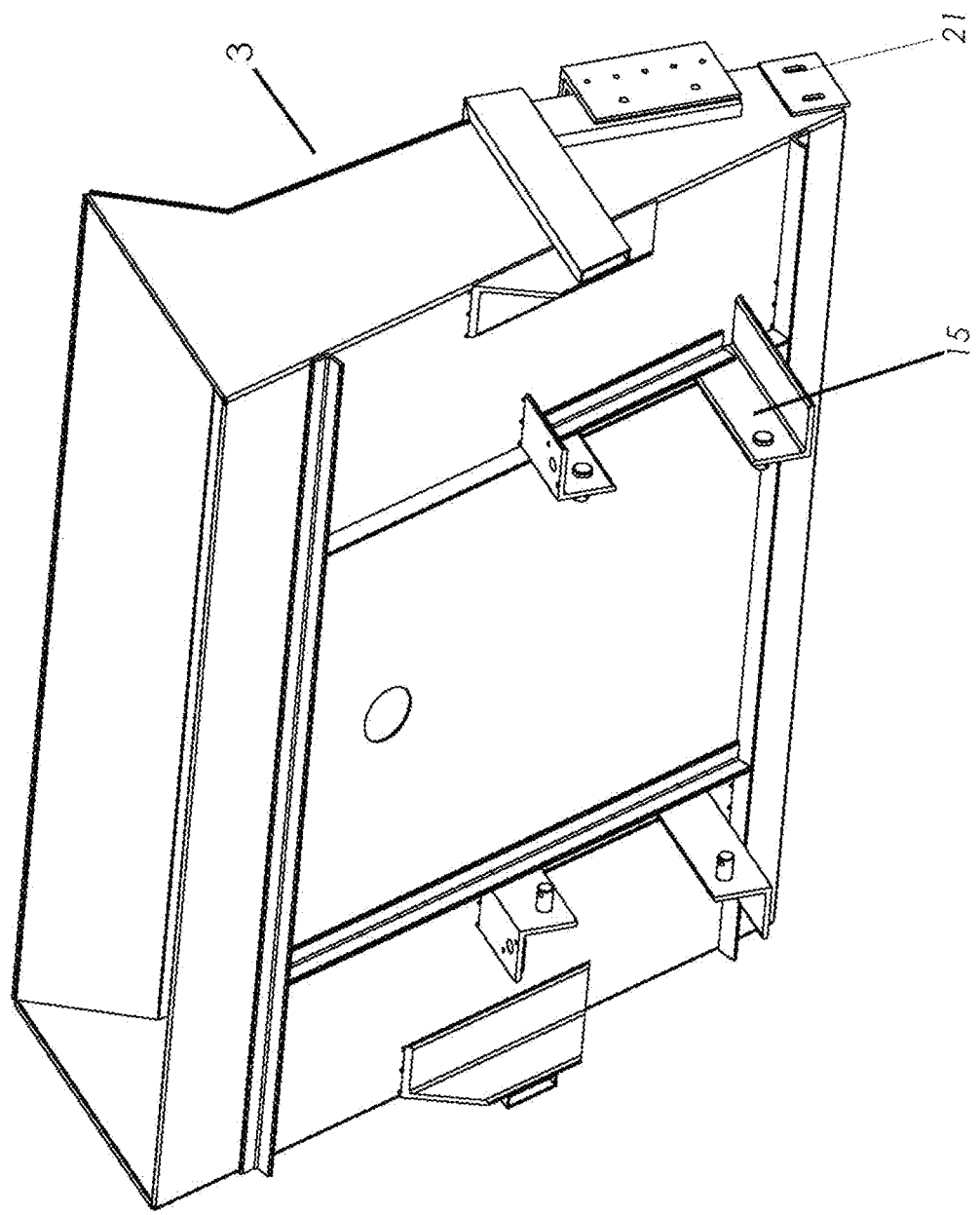
FIG. 7 is a perspective view of a screed box.
Figure 8:
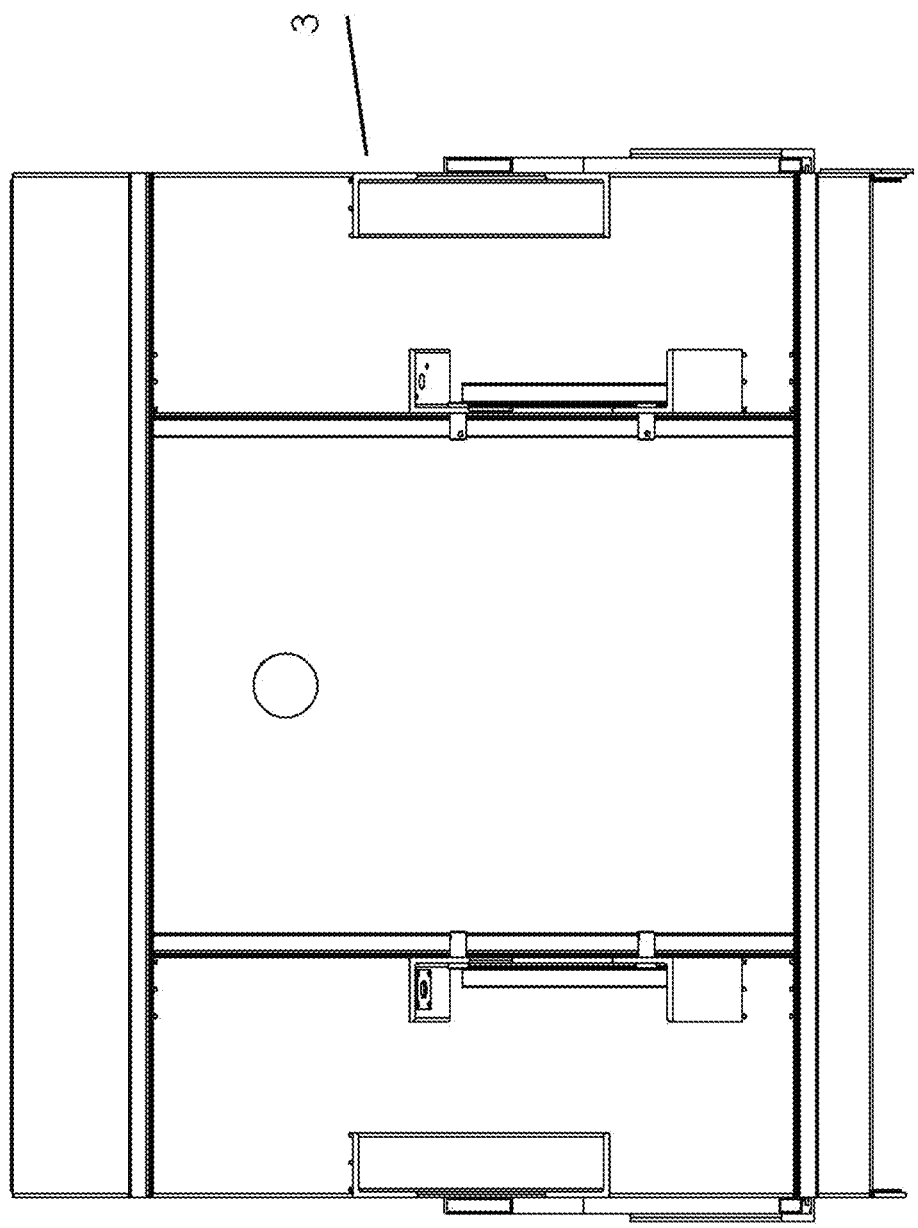
FIG. 8 is a rear view of the screed box.
Figure 9:
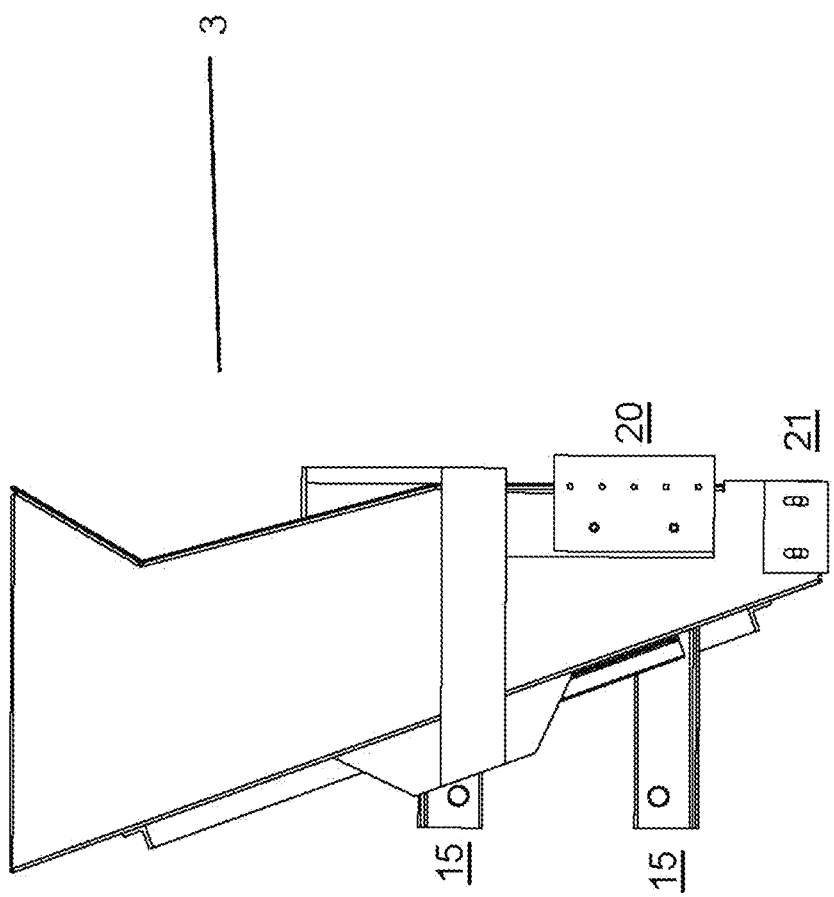
FIG. 9 is a side view of the screed box.

With reference to FIG. 1, there is an automated device for continuously mixing and distributing cementitious mixture onto a ground to create a flooring layer. Driven wheels 10 move the device over the ground and support the main frame 1 that hold the mixing frames 2 and mixing stages.

The present apparatus and method use a number of interconnected but separable modules that continuously mix and apply a cementitious coating to a floor. The complete assembly may have a liquid mixing module 4; a liquid and aggregate mixing module, a screed box 3 and a trowel module 6. The liquid mixing module pumps the two liquid components at a predetermined amount and ratio to make a liquid polymer (first mix).

Geared flow meters are used to measure the flow rate which is then adjusted by closed-feedback actuated valves. These feedback loops run through a microcontroller and algorithms that smooth out the flow and keep a constant ratio between the two liquids. The liquids enter a mixing tube with a sacrificial helix that revolves at 1,200 RPM. This Helix 48 may comprise different spirals, with varying pitches and lengths that alternate between clockwise and counter-clockwise. This thoroughly mixes the two liquids that have very different viscosities, i.e. 150 centiPoise (CP) at 23° C. for polyol compared to 50 CP for isocyanate at 15° C.

The viscosity of the polyol is due to the addition of water suspended in an emulsion. The water acts as a catalyst that starts the exothermic reaction between the polyol and the isocyanate.

Other mixing methods can be used where viscosity is similar such as impingement and static mixing. Impingement requires high pressures, however, preferred embodiments do not use a high-pressure system as this causes problems when mixing with the aggregates.

Similar reference numerals indicate similar components having the following key:
1 main frame assembly
2 mixing frames
3 screed box assembly
4 liquid mixer assembly
5 power trowel lift arm assembly
6 Pneumatic power trowel
7 battery frame
8 Sealed lead-acid 12V deep cycle battery
9 Drive wheel motor and axle
10 Main drive wheels
11 Retractable pivot wheel
12 Retractable pivot wheel electronic linear actuator
13 Main electronics box
14 Lift arm pivot bearing
15 Screed box attachment arms
16 Screed box depth limit set screws
17 Screed box molded interior plastic liner
18 Screed box material leveling blade
19 Screed material leveling blade electronic linear actuators
20 Screed box material leveling blade alignment guide
21 Screed box floor-contact wear strip
22 Mix tray base and frame
23 Final mixer material dispensing tube
24 Air-sand mixture delivery hose
25 Air-sand mixture delivery hose attachment clamp bracket
26 Quick release hold down for air-sand delivery hose securing clamp bracket
27 Air-sand delivery hose securing clamp bracket
28 Mixer rotary actuator
29 Mixer rotary actuator stability bracket
30 Mixer rotary actuator clamp bracket
31 Final mixer end cap retention flange
32 Final mixer positioning support
33 Final mixer quick release hold down clamp
34 Connection tube to transport mixed liquids to final mixer
35 Liquid delivery hoses attachment clamp bracket
36 Liquid delivery hoses
37 Control, regulation, and monitoring box for one liquid type
38 Liquid delivery inlet pressure gauge
39 Electrical connection to main electronics box (13)
40 Liquid A regulator-to-mixer connection hose
41 Liquid A quick-connect connector
42 Liquid mixer positioning and end caps retention flange
43 Shaft coupler between mixer auger and mixer rotary actuator (28)
44 Liquid B regulator-to-mixer connection hose
45 Liquid B hose barb
46 Liquid mixer end cap with shaft seal and bearing
47 Liquid mixer body
48 Liquid mixer multi-pitch/multi-direction rotary mixing helix
49 Liquid mixer module attachment flange
50 Liquid mixer body spacer plate
51 Liquid mixer quick release hold down clamp
52 Final mixer wye for introduction of mixed liquids
53 Final mixer wye for introduction of air-sand mixture
54 Final mixer end cap with shaft seal and bearing
55 Final mixer bearing
57 Final mixer mixing blade
58 Inlet port to liquid control, regulation, and monitoring box
59 Liquid inlet electronic pressure gauge
60 Liquid inlet electronic temperature gauge
61 Liquid regulation electronic valve
62 Liquid flow electronic meter
63 Electronic control circuitry and software for liquid control, regulation, and monitoring
64 Regulated liquid outlet port Liquid Flow Control Smoothing out the flow of the liquids may be achieved in a number of ways. The pneumatic pumps cause pulsing which is initially reduced with flow smoothing bladders that absorb the pneumatic shock, when the liquids pass through the actuated valves and geared flow meters feedback loops with algorithms that adjust the actuated valves and anticipate spikes in the flow, which results in a smooth flow.

In order to reduce costs and promote easy exchangeability for components in contact with the resin and hardener, certain components are designed to be replaced after use. The valves 61 are motorized proportional ball valves that respond to analog electrical signals. The flow through the valve is measured using an oval gear flow meter 62. The flow meter gives an electrical pulse signal for every fixed amount of flow through the meter. The counts are measured for frequency and a pulse rate is calculated. The measurement is averaged over a period of several seconds in order to smooth out inconsistent readings caused by the viscous, lumpy flow of the liquids. The flow value is used to adjust the proportional signal sent to the motorized valve to achieve a consistent measured flow. The ratio of the two flows is maintained at a constant value to ensure a proper mix of liquids.

A microcontroller 63 performs the flow measurements and valve control calculations. A number of parameters are used to calculate the amount of adjustment required to the valve position. These are customized to minimize the spikes of flow due to the pressure shocks of the pneumatic pumps. These parameters include minimum value, maximum value, multiplication factor, and step value.

The flow control algorithm is preferably different between the beginning and end of the flow operation. The algorithm implementation is therefore divided into phases where one algorithm governs flow start operation, one algorithm governs continuous operation and one algorithm governs shutdown operation. Furthermore, the parameters used in the flow control calculations are different for each of the liquid types.

The polyol or Part 1 is an emulsion, so viscous at low temperatures. This part is heated to 23 C and achieves 150 CP making pumping and metering possible. Temperature affects viscosity and tests have shown that 21-25° C., preferable 23° C., is an optimal temperature of the polyol that achieves a viscosity of the polyol compatible with the unheated isocyanate. If Temperature is increased, this reduces the pot life of the mixed liquids causing problems in the screed box and subsequent power travelling to close in the surface.

The Part 1 is pumped directly from drums which are fitted with four equidistant mixing blades, extending from top to bottom of a 45 Gallon Drum. A pneumatic transfer pump moves product through two pressure smoothing 'bladders' set at 80 psi and 20 psi respectively, then through a pressure reducer, all through 300 psi polymer hoses through an actuated valve and geared flow meter. The actuated valve and flow metered are controlled thru a microcontroller which connects wirelessly to the other modules and through a modem to a remote server. The microcontroller is programmed with a feed-back loop that achieves the desired flow rate and smooths out the flow.

The isocyanate or Part 2 is similarly pumped directly from a tote or drums, the isocyanate has a viscosity of 50 CP at 5-10° C., and does not generally need heating unless in temperatures below 0° C. The product then passes through 300 PSI polymer hoses and through the same actuated valve and gear meter arrangement with micro controller and feed back loop to achieve the desired flow rate.

The ratios of the two liquids is 1 to 1.07 by weight of polyol to isocyanate. This translates to 1 to 1.2 by volume as the isocyanate has a higher specific gravity.

Both the polyol Part 1 and the isocyanate enter the liquid mixer after leaving the flow meters. The liquid mixer may be run at 1200 RPM. The top ¼ of the helix where the 2 inlet ports are positioned starts with a wider pitch which reduces to the middle part of the mixing helix—speeding up the flow-here the helix becomes a very gentle pitch with just 1 360 degree turn effectively slowing liquid throughput and quite aggressively mixing the 2 liquids before resuming a similar pitch as the start of the helix to complete the mixing and eject the now well incorporated 2 liquid polymer into the main mixer.

Aggregate Moving, Metering and Mixing with Liquids:

Moving dry graded aggregates and white cement from super sack to main mixer. This is achieved by placing the nozzle bottom of a super sack over a modified shot Crete air lock machine. The aggregates (Part 3) are pneumatically blown out of pockets in a feed rotor bowl through anti-static hose into the main mixer. The air flow is kept at a set rate (e.g. 50-60 litres/second) and 6-7 Bar, this is achieved by using a Mass Air Flow Meter connected to an actuated valve and micro controller. These two components have a feed-back loop algorithm that keeps air flow constant, so if there is extra demand on the supply of air, the actuated valve opens to keep air volume stable, the reverse happens if remote air demand drops.

The aggregate (Part 3) flow rate is controlled by the speed the rotor turns or how quickly pockets of aggregate are blown into the delivery hose. An encoder is mounted on the rotor to measure RPM this is then connected to the micro controller and actuated valve that adjust air flow to the rotor pneumatic motor thus adjusting rotor speed and material flow rate. The material then travels through the anti static hose into the main mixer through a port that is placed before the liquid input port. A helix mixer turning at 600 RPM thoroughly incorporates the dry aggregates into the pre-mixed liquids.

Unincorporated dust is vacuumed off.

With reference to the drawings, the machine meters, mixes and screeds 3 part cementitious polyurethane industrial flooring in a continuous process, as follows.

Part 1(A)—Resin (Polyol)
Part 2(B)—Hardner (Isocyanate)
Part 3 (Air-sand)—Powders (Graded silica sands, aggregates and white cement)

Part 1 liquid is heated to 23 C, pumped (using a pneumatic transfer pump) at 6-7 Bar through a liquid delivery hose 36 to the Liquid mixer assembly 4.

Part 1 passes through a liquid delivery inlet pressure Gauge 38 into a Control, regulation and monitoring box 37 in which it is regulated by liquid electronic regulation valve 61 and monitored by liquid flow electronic meter 62. The feed back loop algorithm and valve control are monitored and controlled by the Electronic control circuitry and software for liquid control, regulation and monitoring microcontroller 63. From here Part 1 passes into the liquid mixer 47 through connector 41 in here it is brought into contact with Part 2 and is thoroughly mixed together with the reversing helix 48.

Part 2 liquid is pumped (using a pneumatic transfer pump) at 100 PSI through a liquid delivery hose 36 to the Liquid mixer assembly 4.

Part 2 passes through a liquid delivery inlet pressure Gauge 38 into a Control, regulation and monitoring box 37 in which it is regulated by liquid electronic regulation valve 61 and monitored by liquid flow electronic meter 62. The feed back loop algorithm and valve control are monitored and controlled by the Electronic control circuitry and software for liquid control, regulation and monitoring microcontroller 63. From here Part 2 passes into the liquid mixer 47 through connector 45 in here it is brought into contact with Part 1 and is thoroughly mixed together with the reversing helix 48.

Both liquids—P1&P2 (mixed) then enter the final mixer through hose 34.

The Powders—P3 are pneumatically blown from a dry powder machine using an air lock system. The flow of P3 is controlled and monitored in the same way as the liquids but with liquid flow meter 62 replaced by a mass air flow meter and rotary encoder.

Figures 10A, 10B:
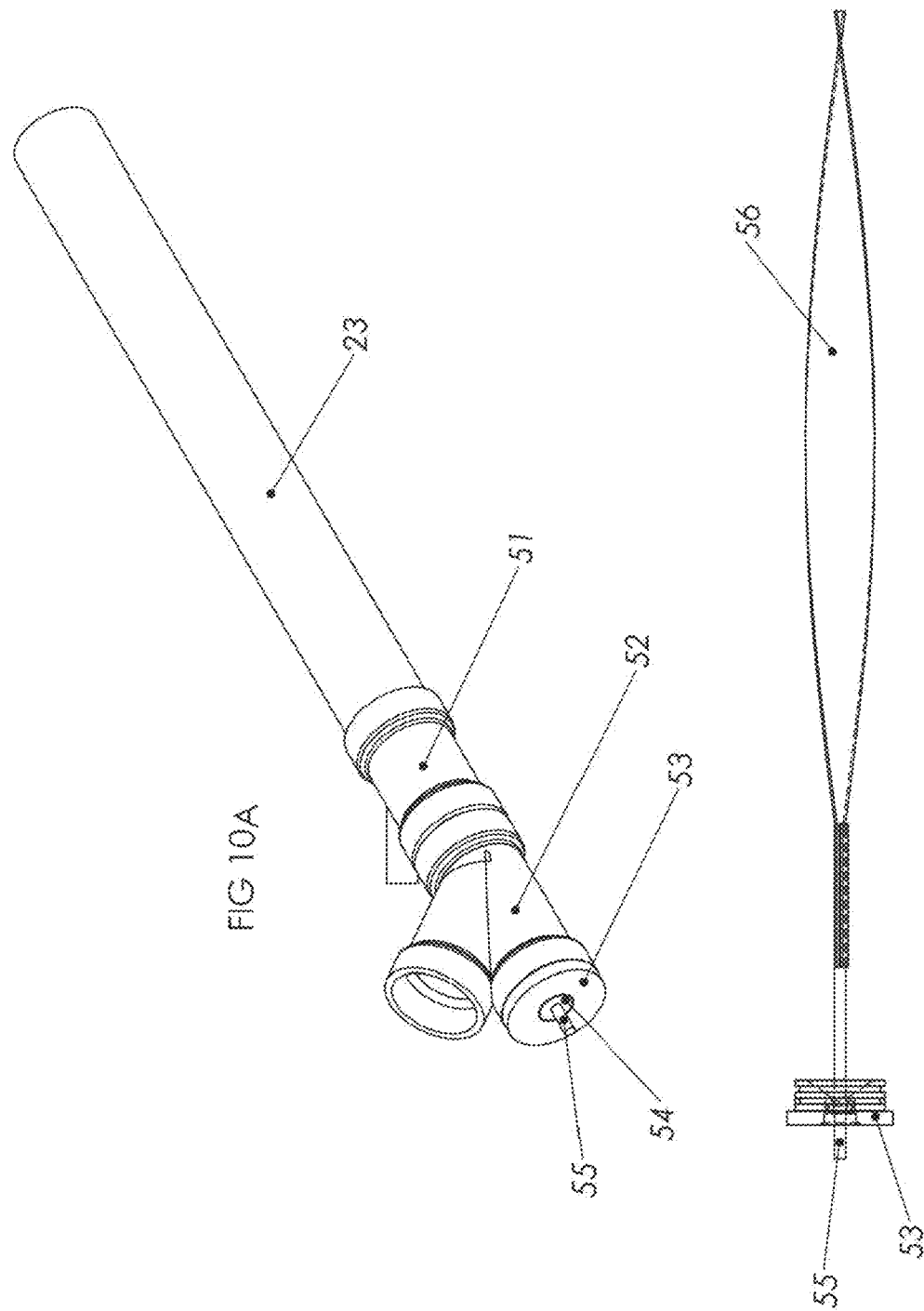
FIG. 10A is a view of the final mixer.
FIG. 10B is an exploded view of the final mixer with blade.

Part 3 enters the final mixer through hose 24 and is joined by the pre-mixed liquids, all three are then mixed together with the Final mixer mixing blade 56 [ ] (see FIGS. 10A, 10B).

The completed mix is then dispensed through tube 23 into the screed box 3. When a 'reservoir' of 3" is in the box the main bot or frame 1 moves back screeding the material to a pre-determined thickness (e.g. 5-10 mm).

As the machine screeds out material the power trowel arms 5 lower the power trowel 6 onto the material to close in and finish the surface.

Web App Control

In order to provide the greatest flexibility in terms of control and remote access, an interactive web app control system was set up. A microcontroller runs a web-accessible interface that provides one or more operators control over all aspects of the device's operation. The flow rates, mix ratios, air flow, particulate rates and so on can be adjusted on the device but selected remotely. Detailed records of material usage are logged as well as sensor data from all the sensors in the various subsystems. An onboard reporting system displays charts of the sensor values during operation and stores data for subsequent recall.

Furthermore, use of a wireless communication system on site allows for the incorporation of supplemental microcontrollers to control additional sub-components of the machine. The supplemental microcontrollers are operatively coupled to the microcontroller that provides the web app interface to the operators via wireless communication system such that they receive commands from and provide reporting data back to the web app system. For example, the aggregate pump system that provides the aggregate in via a suspended air/aggregate mix has two valves and two sensors connected to a microcontroller. That microcontroller receives commands from the web app system instructing when to turn on and when to turn off and the sensor values that it should target. The microcontroller adjusts the valve settings in an algorithmic fashion to match the amount of air flow measured via a Mass Air Flow sensor and the amount of RPM turn in the aggregate introduction system via an angular encoder.

Advantageously, the screed box 3 may be removable and its height may be automatically adjustable relative to the frame via a microcontroller. The screed blade's height may be tied to laser levels such that the depth of deposition is consistent at some predetermined thickness. The screed blade height may continuously adjusted to create a floor coating of varying thickness, which is useful is laying a sloping floor, even on a level concrete substrate.

Moreover, the blade's shape 18 may be narrow at the bottom and wide at the top, allowing for the insertion of a removable liner to protect the box which saves cleaning time and extends the life of the box.

Preferably the mixer is inclined at an angle to induce flow out of the mixer. A quick disconnect coupling attached thereto enables easy remove for physical, non-chemical cleaning, or disposal. Preferably the operator can remove the subframe and use the mixer as a standalone device that used the valves and flow meters to create a consistent mixture.

The final mixer may employ mechanical agitation to aid in mixing between liquid and dry components. Preferably there is an in-line dust removal component to match the amount of air being used to transfer the aggregate. Alternatively, the mixing auger 48 may have continuous or discrete blades, have a consistent or varying pitch. In some embodiments, the blade may have a) a decreasing pitch from start to finish, b) a mixer blade midway, or c) a non-continuous helix.

Drive System

The device may have a drive system for moving the device around the floor. The drive system may include motors, preferably electric motors to drive 2 or 4 of the wheels. The wheelbase is preferably longer in the direction of depositing the coating for increased directional accuracy. The drive system may include an electrically actuated drop-down pivot wheel 11 to facilitate moving the device around on a tight radius.

Attached Power Trowel

The device may have two shaped arms 5 allowing for positioning of the trowel reaching over the screed box, which positioning may be electronically actuated to raise and lower. The arms may move with lateral actuation to provide a seal coating between adjacent deposits of mixture. An electronic valve may be employed to control the on/off of the blades and/or its rotational speed

The invention claimed is:

1. A device for continuous mixing and laying of cementitious polyurethane coating onto a substrate comprising:
   a source of a first liquid comprising a resin;
   a source of a second liquid comprising a hardening agent;
   a source of aggregate;
   a first mixing stage comprising liquid flow meters and flow controllers for metering and restricting a flow of the first liquid and the second liquid and a mixer for mixing the first liquid and the second liquid to create a polymer mix;
   a second mixing stage having a dry powder machine with an air lock arranged to blow the aggregate, a mass flow meter for metering the flow of the blown aggregate, and a mixer for mixing the polymer mix with the blown aggregate to form a cementitious polyurethane mix;
   a controller operatively coupled to the liquid flow meters, mass flow meter, and flow controllers for controlling the first and second mixing stages in a closed-feedback arrangement to produce said cementitious polyurethane coating; and
   a screed box to apply the cementitious polyurethane mix onto the substrate to create said cementitious polyurethane coating of a predetermined thickness.

2. The device of claim 1, wherein the first mixing stage employs a helical mixing auger.

3. The device of claim 2, wherein the helical mixing auger has a varying pitch or a non-continuous helix.

4. The device of claim 1, further comprising drive means for automatedly moving the device around a floor.

5. The device of claim 1, further comprising an adjustment mechanism for adjusting a height of a screed blade from the substrate.

6. The device of claim 1, further comprising a heater in the first mixing stage to preheat the first liquid between 20-28° C. before mixing with the second liquid.

7. The device of claim 1, wherein the first liquid's viscosity is at least twice that of the second liquid's viscosity.

8. The device of claim 1, wherein the mixes do not comprise a catalyst.

9. The device of claim 1, further comprising a powered trowel having blades for spreading the second mix over the substrate.

10. The device of claim 1, wherein the first liquid comprises Polyol.

11. The device of claim 1, wherein the second liquid comprises isocyanate.

12. A method of continuously mixing and laying cementitious polyurethane coating onto a substrate with an automated device, comprising the steps of:
    loading a first liquid comprising a resin within the device;
    loading a second liquid comprising a hardening agent within the device;
    loading aggregate within the device;
    automatedly metering and restricting a flow of the first liquid and the second liquid at a first mixing stage comprising liquid flow meters and flow controllers then mixing the liquids to create a polymer mix;
    automatedly metering and restricting a flow of the polymer mix at a first mixing stage comprising liquid flow meters and flow controllers then mixing the liquids to create a polymer mix;
    using a dry powder machine with an air lock to blow the aggregate, metering the flow of the blown aggregate with a mass flow meter, and mixing the polymer mix with the blown aggregate at a second mixing stage to form a cementitious polyurethane mix;
    using a controller operatively coupled to the liquid flow meters, mass flow meter, and flow controllers to control the first and second mixing stages in a closed-feedback arrangement to produce said cementitious polyurethane mix; and
    dispensing the cementitious polyurethane mix onto the substrate using a screed box to create the cementitious polyurethane coating of a predetermined thickness.

13. The method of claim 12, wherein the first liquid and a second liquid are mixed using a helical mixing auger.

14. The method of claim 13, wherein the helical mixing auger has a varying pitch or a non-continuous helix.

15. The method of claim 12, wherein the first liquid is a Polyol.

16. The method of claim 12, wherein the second liquid is a isocyanate.

17. The method of claim 12, further comprising preheating the first liquid between 20-28° C. before mixing with the second liquid.

18. The method of claim 12, wherein the first and second liquids have different viscosities.

19. The method of claim 12, wherein the first liquid's viscosity is at least twice that of the second liquid's viscosity.

20. The method of claim 12, further comprising spreading the cementitious polyurethane mix over the substrate using a powered trowel.

* * * * *